United States Patent
Kealy

(10) Patent No.: US 8,007,024 B2
(45) Date of Patent: Aug. 30, 2011

(54) RAISABLE TRUCK BED COVER

(75) Inventor: Jerry Kealy, Chicago, IL (US)

(73) Assignee: Jerry Kealy, Chicago, IL (US)

( * ) Notice: Subject to any disclaimer, the term of this patent is extended or adjusted under 35 U.S.C. 154(b) by 0 days.

(21) Appl. No.: 12/696,737

(22) Filed: Jan. 29, 2010

(65) Prior Publication Data

US 2010/0194137 A1   Aug. 5, 2010

Related U.S. Application Data

(60) Division of application No. 12/105,602, filed on Apr. 18, 2008, now Pat. No. 7,654,603, which is a continuation-in-part of application No. PCT/US2006/040679, filed on Oct. 19, 2006.

(60) Provisional application No. 60/728,983, filed on Oct. 21, 2005.

(51) Int. Cl.
*B60P 7/02* (2006.01)
(52) U.S. Cl. .................................. 296/100.02
(58) Field of Classification Search ............ 296/100.02, 296/100.01, 100.1, 165, 37.6, 100.12
See application file for complete search history.

(56) References Cited

U.S. PATENT DOCUMENTS

| | | | | | |
|---|---|---|---|---|---|
| 1,079,205 | A | * | 11/1913 | Beebe | 296/98 |
| 2,531,140 | A | * | 11/1950 | Linde | 296/100.08 |
| 2,901,286 | A | | 8/1959 | Harris | |
| 2,947,566 | A | * | 8/1960 | Tower | 296/10 |
| 3,155,423 | A | * | 11/1964 | Cripe | 296/100.08 |
| 3,217,449 | A | * | 11/1965 | Levere | 52/143 |
| 3,286,414 | A | | 11/1966 | Harrison et al. | |
| 3,403,936 | A | * | 10/1968 | Young | 296/26.07 |
| 3,506,300 | A | * | 4/1970 | Remmert | 296/171 |
| 3,519,306 | A | * | 7/1970 | Young | 296/171 |
| 3,649,073 | A | * | 3/1972 | Whittemore | 296/100.08 |
| 3,674,305 | A | * | 7/1972 | Steury | 296/156 |
| 3,675,885 | A | * | 7/1972 | Shute | 248/351 |
| 3,749,439 | A | * | 7/1973 | Ferguson | 296/26.05 |
| 3,765,713 | A | * | 10/1973 | Suitt | 296/3 |
| 3,765,716 | A | * | 10/1973 | Van Gompel | 296/100.08 |
| 4,167,284 | A | * | 9/1979 | Messina | 296/171 |
| 4,171,843 | A | * | 10/1979 | Steury | 296/156 |
| 4,211,448 | A | * | 7/1980 | Weston | 296/3 |
| 4,299,421 | A | * | 11/1981 | Bontrager | 296/26.05 |
| 4,328,989 | A | * | 5/1982 | Childers | 296/26.05 |
| 4,378,127 | A | * | 3/1983 | Rossi, Sr. | 296/3 |
| 4,509,787 | A | * | 4/1985 | Knaack et al. | 296/3 |
| 4,518,194 | A | | 5/1985 | Kirkham et al. | |
| 4,522,440 | A | | 6/1985 | Gostomski | |
| 4,603,901 | A | * | 8/1986 | McIntosh et al. | 296/165 |
| 4,613,181 | A | * | 9/1986 | Rafi-Zadeh | 296/100.08 |
| 4,673,209 | A | * | 6/1987 | Rafi-Zadeh | 296/100.08 |
| 4,815,786 | A | * | 3/1989 | McRay | 296/165 |

(Continued)

OTHER PUBLICATIONS

Lieca N. Brown, "Equip-A-Truck", Downloaded Jun. 29, 2004, Publisher: BNP Media, Published in: http://www.pobonline.com.

(Continued)

*Primary Examiner* — Kiran B. Patel
(74) *Attorney, Agent, or Firm* — Blanchard & Associates

(57) ABSTRACT

A raisable truck bed cover protects the contents of the truck bed from the elements and theft, while allowing access to the contents when materials are placed on the cover. The raisable cover maintains the storage capability of the original truck design while allowing additional material hauling capacity by way of the cover and an optional ladder rack system.

14 Claims, 4 Drawing Sheets

U.S. PATENT DOCUMENTS

| | | | |
|---|---|---|---|
| 4,848,830 A | 7/1989 | Parson | |
| 4,856,841 A * | 8/1989 | Rafi-Zadeh | 296/100.08 |
| 4,909,561 A | 3/1990 | Lovaas | |
| 5,002,329 A * | 3/1991 | Rafi-Zadeh | 296/100.08 |
| 5,104,175 A | 4/1992 | Enninge | |
| 5,108,141 A * | 4/1992 | Anderson | 296/3 |
| 5,161,851 A * | 11/1992 | Rafi-Zadeh | 296/26.07 |
| 5,192,107 A * | 3/1993 | Smith, Sr. | 296/3 |
| 5,299,722 A | 4/1994 | Cheeny | |
| 5,305,512 A * | 4/1994 | Ward | 29/401.1 |
| 5,364,154 A * | 11/1994 | Kaiser | 296/100.07 |
| 5,366,266 A * | 11/1994 | Harbison | 296/100.02 |
| 5,375,900 A * | 12/1994 | Tessenyi et al. | 296/100.08 |
| 5,503,450 A * | 4/1996 | Miller | 296/100.08 |
| 5,758,921 A | 6/1998 | Hall | |
| 5,769,485 A * | 6/1998 | Bontrager et al. | 296/171 |
| 5,806,905 A * | 9/1998 | Moore | 296/3 |
| 5,868,453 A * | 2/1999 | Steigner | 296/100.1 |
| 5,951,096 A * | 9/1999 | Steury et al. | 296/171 |
| 6,077,007 A | 6/2000 | Porter et al. | |
| 6,086,134 A * | 7/2000 | Cravens et al. | 296/100.06 |
| 6,106,051 A | 8/2000 | Miskowic | |
| 6,206,456 B1 * | 3/2001 | Steury et al. | 296/173 |
| 6,209,944 B1 * | 4/2001 | Billiu et al. | 296/100.02 |
| 6,234,559 B1 | 5/2001 | Block et al. | |
| 6,254,169 B1 | 7/2001 | Arthur et al. | |
| 6,283,536 B1 * | 9/2001 | Muzyka et al. | 296/165 |
| 6,299,232 B1 | 10/2001 | Davis | |
| 6,343,828 B1 * | 2/2002 | Young et al. | 296/100.1 |
| 6,494,524 B2 * | 12/2002 | Lambright | 296/173 |
| 6,572,174 B2 * | 6/2003 | Hernandez et al. | 296/100.09 |
| 6,663,160 B2 * | 12/2003 | Yarbrough et al. | 296/100.06 |
| 6,666,490 B1 * | 12/2003 | Thacker | 296/26.07 |
| 6,712,422 B1 * | 3/2004 | Vaillancourt | 296/165 |
| 6,729,670 B1 * | 5/2004 | Buls et al. | 296/26.13 |
| 6,761,387 B2 * | 7/2004 | Sloss | 296/3 |
| 6,820,915 B2 | 11/2004 | Mack et al. | |
| 6,883,855 B2 | 4/2005 | Chverchko et al. | |
| 6,981,729 B2 * | 1/2006 | Steury | 296/26.04 |
| 7,014,238 B2 * | 3/2006 | Gonzalez | 296/26.05 |
| 7,246,843 B2 * | 7/2007 | Lambright | 296/173 |
| 7,481,480 B2 * | 1/2009 | Thacker | 296/100.06 |
| 2006/0170239 A1 * | 8/2006 | Altman | 296/100.02 |
| 2008/0079277 A1 * | 4/2008 | Wethington | 296/3 |
| 2009/0166390 A1 * | 7/2009 | Flaherty | 224/405 |

OTHER PUBLICATIONS

Tailgater Inc., "Secure Lid", Downloaded Jul. 1, 2004, pp. 1-2, Publisher: Tailgater Inc., Published in: http://www.tailgater.net/showcasesecurelid.htm.

* cited by examiner

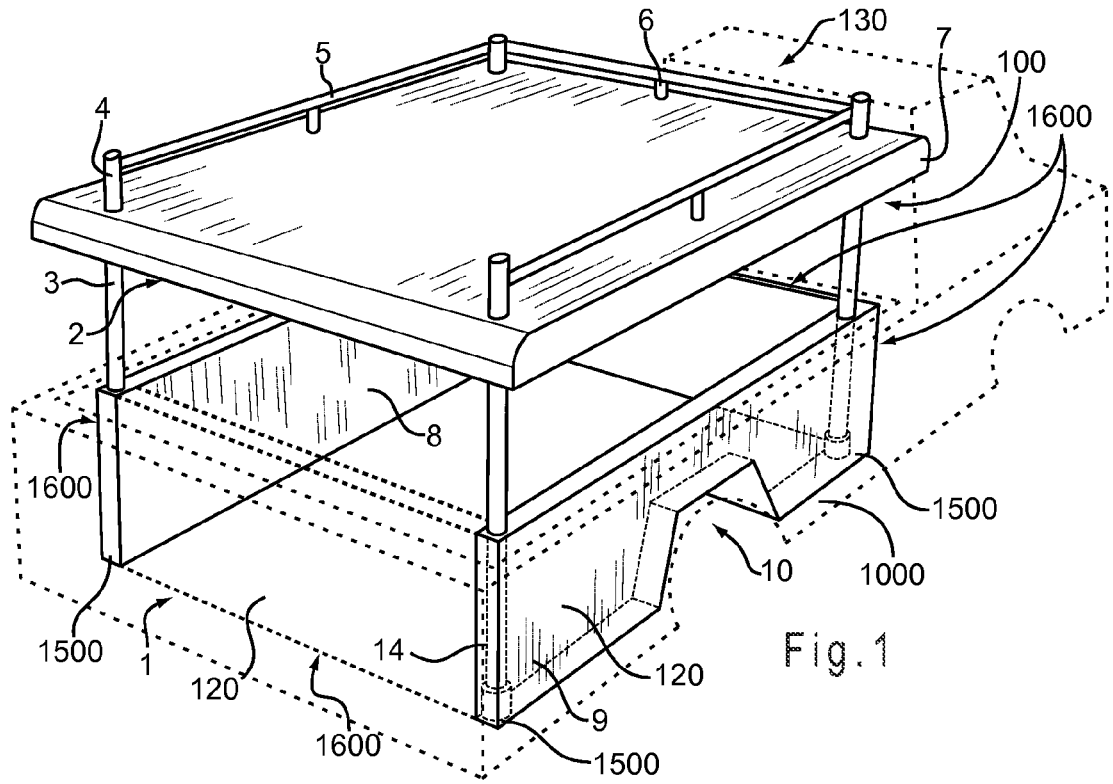
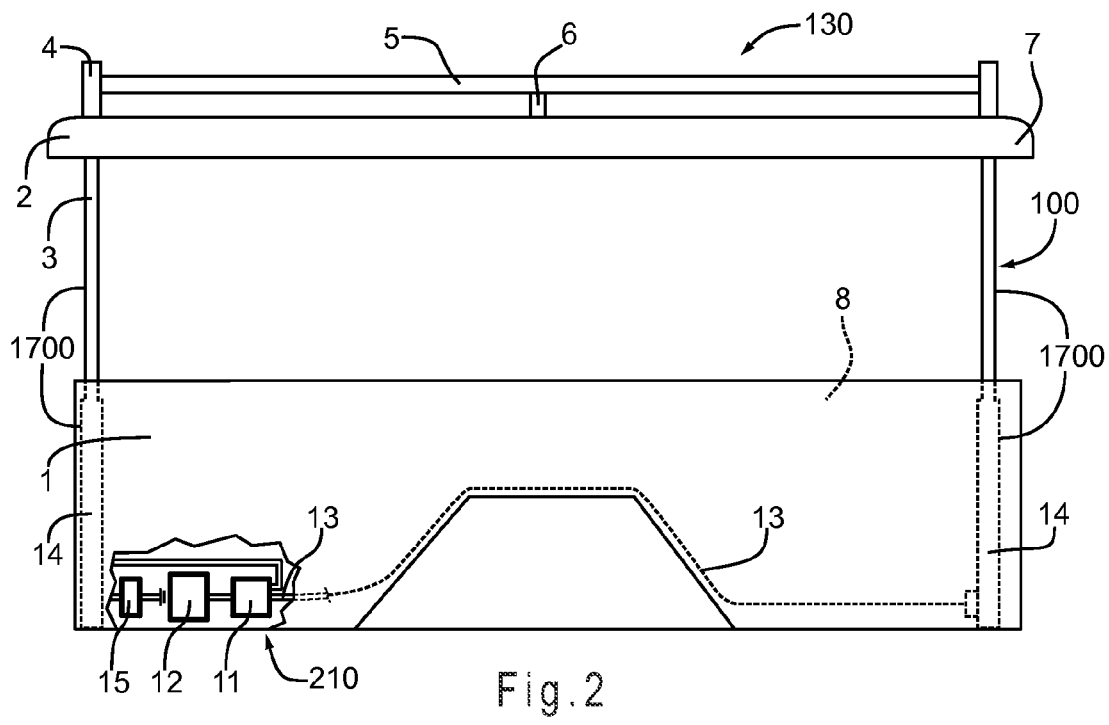

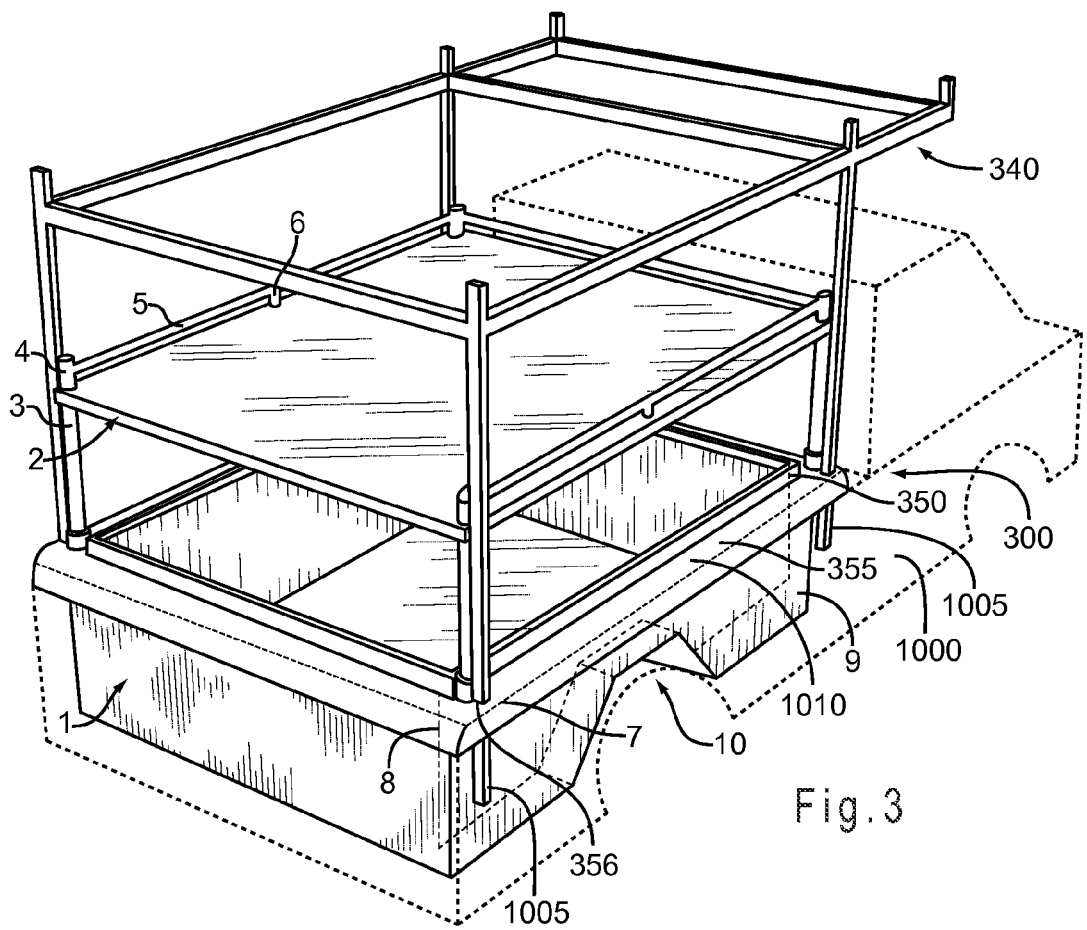
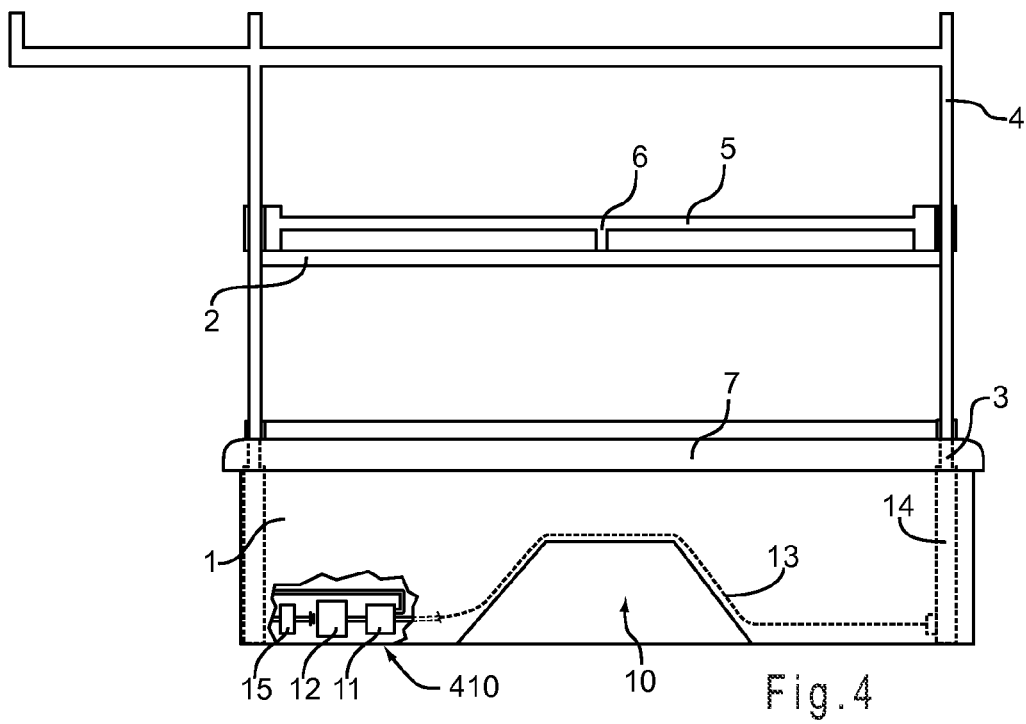

RAISABLE TRUCK BED COVER

REFERENCE TO RELATED APPLICATIONS

This application is a divisional of U.S. Nonprovisional application Ser. No. 12/105,602, filed Apr. 18, 2008, entitled "Raisable Truck Bed Cover," which is a continuation-in-part of International Application No. PCT/US2006/040679 entitled "Raisable Truck Bed Cover" as filed on Oct. 19, 2006, which was published in English and claimed the benefit of U.S. Provisional Application No. 60/728,983 entitled "Raisable Truck Bed Cover" as filed on Oct. 21, 2005, each of which are incorporated herein by reference.

BACKGROUND

The open, cargo section of a truck, such as the bed of a pickup, is typically used to haul cargo or store objects that do not fit in the limited cab space. One disadvantage of open bed designs is that objects placed in the cargo section are exposed to weather, vandalism, and theft. Conventional cover systems exist that protect the contents of the bed from weather and in some aspects from theft. However, a disadvantage of these conventional cover systems is that the area above the cover cannot be used to transport additional materials, such as plywood, wall-board, or other bulky items, without preventing access to the contents of the bed. Furthermore, many conventional covers have the added disadvantage of not being able to coexist with ladder racks, if the truck is so equipped.

For example, U.S. Pat. No. 6,254,169 provides a storage cover, but prevents access to materials on top of the box, allows no access from the sides to the interior of the truck bed when the cover is open, and cannot be readily used in conjunction with ladder racks. As with most conventional designs, the covers pivot vertically from the truck bed. When open, the bed covers are nearly perpendicular to the perimeter lip of the bed.

U.S. Pat. Nos. 5,299,722 and 6,234,559 describe cover assemblies with integrated toolboxes. These designs also do not allow for materials to be carried on the assembly and cannot easily be incorporated with a standard ladder rack. The designs allow for only limited access from the sides or rear to the interior of the truck bed. Again, the covers of these systems do not raise and lower in a parallel manner to the bed of the truck.

U.S. Pat. Nos. 4,522,440; 5,104,175; and 6,299,232 describe raising cover systems where the cover pivots up from the perimeter of the truck bed. The disclosed cover cannot be readily used in conjunction with ladder racks. Further, materials may not be transported on top of the cover. These designs allow for only limited access to the interior of the truck bed when the unit is raised.

U.S. Pat. No. 4,613,181 discloses a light duty cover that raises in a substantially parallel manner to the perimeter of the truck bed, but lacks a suitable storage box under the cover to provide security for tools and other materials. The disclosed system also lacks the ability to support loads on the cover or to lift them from the resting position. The ability to easily use the system with ladder racks also is lacking.

U.S. Pat. No. 4,328,989 describes a storage container that may be raised from the truck bed. While the design allows for materials to be transported on top of the container, the depicted apparatus does not readily allow for use with ladder racks and requires a complex system of shafts, chains, and sprockets to operate. Furthermore, the depicted apparatus prevents the use of the interior portion of the truck bed except for items held in the storage container and mounts the lifting posts to the bed of the truck. Such mounting of the lifting posts to the bed of the truck requires alteration of the truck bed with holes and the like.

As apparent from the above description, there is an ongoing need for a truck bed cover system that provides protection, security, and access to the contents of the bed, while simultaneously allowing for additional materials to be carried above the cover.

SUMMARY

Utility trucks, such as pick-up trucks, allow for great versatility in storage and hauling of goods and materials. The functionality of a truck is hindered by the exposure of the materials contained by the bed to the elements and the potential for theft and vandalism. A raisable truck bed cover is provided that protects the contents of the bed from the elements and theft, while allowing easy access to the contents when materials are placed on the cover. Thus, the raisable cover maintains the storage capability of the original truck design, but adds additional material hauling capacity by way of the cover and the optional ladder rack system. The versatile design allows for the removal and transfer of the raisable cover system from one truck to another.

A bed system for a truck bed is provided that includes a raisable cover, a storage box adapted to reside in the truck bed, and at least two lifting devices engaging the raisable cover and the storage box, where the lifting devices are operable to raise the cover in a substantially planar relationship to the truck bed. The system may include four lifting devices positioned substantially in each of the four internal corners of the storage box. In a preferred aspect, the lifting devices are hydraulic cylinders.

A bed system for a truck bed also is provided that includes a raisable cover, a ladder rack attached to the truck bed, and at least two lifting devices engaging the raisable cover and the storage box, where the lifting devices are operable to raise the cover in a substantially planar relationship to the truck bed. The cover may include head chambers and stabilizing cover guides, the guides providing operative connectivity between the ladder rack and the head chambers.

Other devices, methods, features and advantages of the invention will be, or will become, apparent to one with skill in the art upon examination of the following figures and detailed description. It is intended that all such additional devices, methods, features and advantages are within the scope of the invention.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 1 depicts a perspective view of a bed system including a storage box and a cover in the raised position.

FIG. 2 is a side view of the system with the cover in a raised position. The cut away details the hydraulic lift system and the tubing reaching the hydraulic cylinders in the four corners of the box.

FIG. 3 is a perspective view of a heavy duty bed system with an added ladder rack.

FIG. 4 depicts a side view of the ladder rack equipped system with the cover in the raised position and a cut-away provided to show the hydraulic lift system.

DETAILED DESCRIPTION

Figure 5:
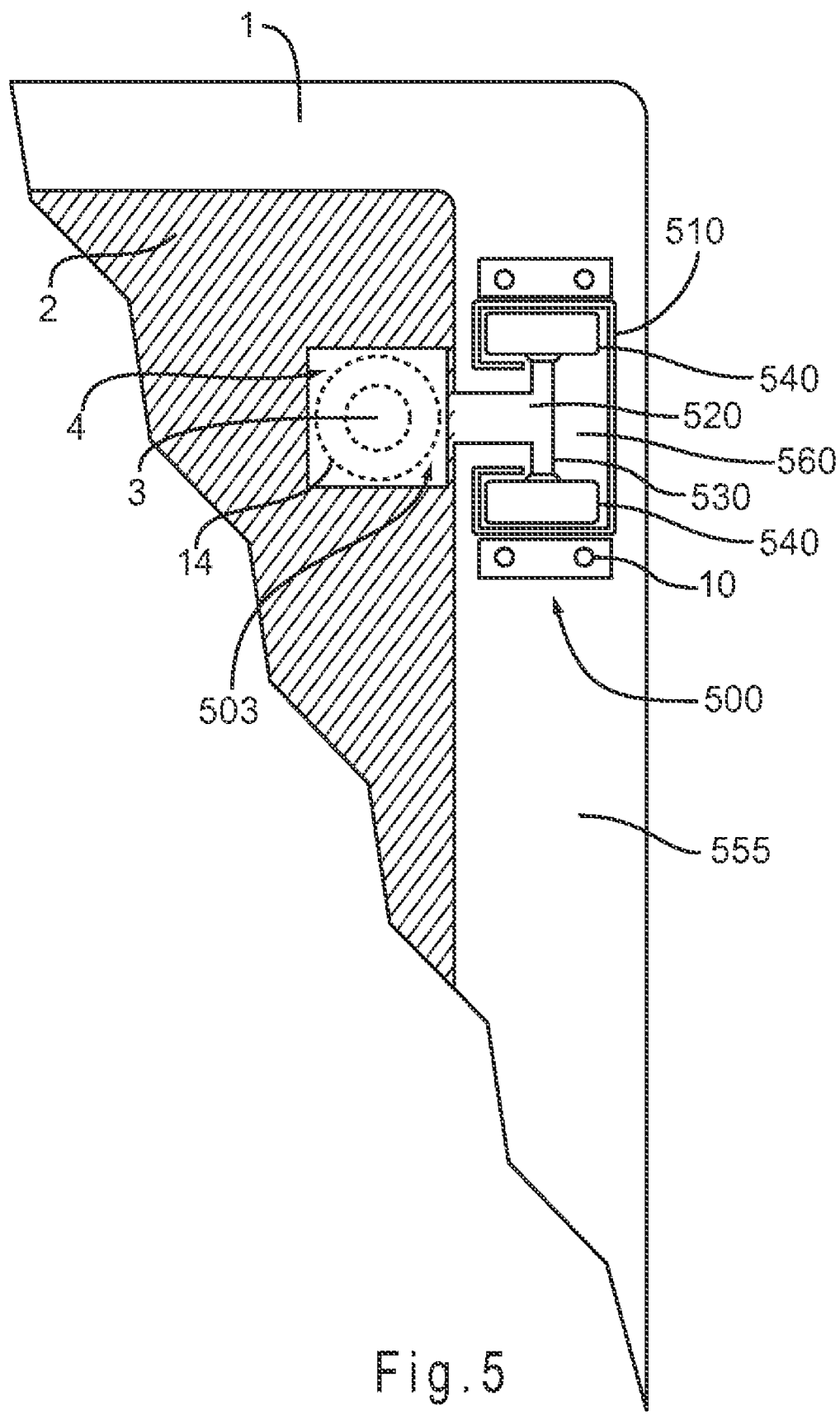
FIG. 5 details a cover stabilizing system incorporated with the ladder rack.

Bed systems including a raisable cover for covering and securing the contents of a truck bed 1000 while allowing access to the contents are disclosed. The system may be a self-contained storage and hauling system that may be secured in the bed of a standard pick-up truck or trailer. The system may include a storage box 1 and a cover 2. The system features a compartment with a secure and substantially watertight cover that may be raised via a hydraulic lifting system. The cover 2 may provide for the safe storage of items in the bed of the truck below the cover as well as for the hauling of materials, such as plywood, lumber, and ladders, on top of the cover. The cover 2 may be raised and lowered via four lifting devices 1700, such as hydraulic cylinders, placed in the four interior corners 1500 of a storage box. The hydraulic system preferably resides in the area between the wheel well and the cab of the truck.

Unlike in conventional systems, the raisable cover of the present invention may be raised and lowered in substantially the same plane as that occupied by the truck bed. The ability of the cover to raise and lower in a substantially parallel manner to the top of the truck bed provides the ability to place items on top of the cover and move them out of the way by raising the cover when accessing the interior of the bed. Thus, the cover is not required to be hinged to the truck bed or the storage box, as in conventional designs. In one aspect, the cover only may be attached to the lifting devices.

The storage box portion of the system may be constructed of lightweight aluminum, steel, or fiberglass and may be bolted or affixed by other means to the bed of the truck. The bolting system may allow for the easy removal of the storage box if desired, such as for transfer to another vehicle, but maintains the security of the system while installed in the truck bed. The storage box may be adapted to reside in the truck bed without bolts or other affixation means, instead relying on its size in relation to the size of the truck bed. If the storage box is made of a material that may flex, it may be held in the truck bed by an interference fit. When bolts are used, the bolts may pass through the truck bed. In another aspect, the bolts may be equipped with wedges or other means to form an interference fit with the sides, upper lip, or the like of the truck bed.

The cover may be constructed of durable aluminum, lightweight steel, fiberglass, carbon fiber, composites, combinations of these materials, and the like, with the possibility of a reinforced and/or trussed substructure for added strength. In one aspect, the cover is a structurally rigid, substantially planar sheet. The hauling capacity on the top of the cover may be comparable to the manufacturer's recommended truck bed weight capacity (light duty box for half-ton, medium duty for ¾-ton, and heavy duty for one-ton and larger trucks.) The edges of the cover may be curved to envelope the sides of the truck and further secure the storage compartment.

Heavy duty trucks may add a racking system to the storage box for additional material hauling capability. This ladder rack may provide additional stability to the cover during movement via an integrated roller system. The rack may be constructed of lightweight steel, aluminum, composite, and the like. The additional stability provided by the rack may be especially preferred when multiple large and/or heavy items are being carried on the cover.

FIG. 1 depicts a perspective view of a bed system 100 including a storage box 1 and a cover 2 in the raised position. Outside walls 120 and inside walls 8 form the storage box 1 and may be constructed of aluminum, lightweight steel, fiberglass, composites, combinations of these and other materials, and the like. While the storage box 1 has four sides 1600, the box may be constructed having three (not shown). This may be desirable where access through the tail gate of the truck is desired. Access through the tail gate of the truck also may be provided by hinging the bottom of one side 1600 of the storage box 1, thus opening in a similar manner to the tailgate of the truck bed. Additionally, an inside wall 8 is not required for each outside wall 120. Thus, if a storage box 1 is constructed with four sides 1600, the side in front of the tail gate and/or the side behind the cab may have a single wall.

In one aspect, a cavity 9 may be provided between the outside and inside walls 120, 8, respectively. The cavity 9 may have a width of from six to eight inches. The cavity 9 may house hydraulic or other components (not shown) that operatively attach the storage box 1 and the cover 2, as discussed further below. The inside walls 8 may include accessible panels (not shown) providing access to the hydraulic or other components for the purposes of maintenance, repair and the like. Wheel well 10 may be formed into the storage box 1 and provides for ease of installation and attachment of the storage box 1 to pick-up and other truck beds (not shown) having wheel arches internal to the bed.

The cover 2 may be constructed of the same or a different material than the storage box 1. The perimeter of the cover 2 may include a curved edge 7, which extends over a top portion of a truck bed, when the cover 2 is lowered onto the bed. The curved edge 7 may provide a seal between the cover 2 and the truck bed to assist in sealing the bed against the weather and break-in.

While the cover 2 may be formed from one or more panels, preferably the cover 2 is formed from a single panel or multiple panels bonded and/or joined to form a single panel. Each panel may be formed as a sheet attached to structural members. The thickness of the sheet material may be from about 1.5 centimeters (cm) to about 8 cm. The structural members may be formed from materials including aluminum, stainless steel, carbon steel, fiberglass, resin fiber combinations, plastics, polymers, and combinations thereof. Preferably shapes for the members include those exhibiting strength when a load is applied perpendicular to the longitudinal axis of the shape, including, beam, right angle, c-channel, u-channel, tube (round or square), I-beam, and honeycomb.

The spacing of the structural members for the cover 2 may be selected to provide the desired strength to the cover. For example, if the structural member is a honeycomb shape, the support may be substantially uniform throughout the panel due to the small spacing between the structural members. The relatively small spacing between the members may allow the sheet to be formed from a thinner and/or lighter material. Conversely, when a relatively larger spacing exists between the structural members, such as when multiple beams are used, the sheet may need enhanced rigidity.

For example, the cover 2 could be formed from an about 2 cm thick aluminum enclosing c-channel shaped zinc galvanized steel structural members. The structural members may be spaced about 30 cm apart or less from each other and may be positioned substantially perpendicular to the longitudinal length of the storage box 1. Alternatively, the structural members may be positioned substantially parallel to the longitudinal length of the storage box 1.

The structural members may be attached to the sheet by riveting, welding, bolting, bonding, gluing, and the like.

Alternatively, the members may be trapped by interference fit with the shaped sheet. The structural members may allow the weight supported by the cover 2 to be transferred to the bedrails of the truck or preferably to be transferred to the storage box 1 when the cover 2 is fully lowered.

Hydraulic pistons 3 operatively connect the storage box 1 with the cover 2, allowing for the cover 2 to be raised and lowered. While the hydraulic pistons 3 are preferred to provide the operative connection between the storage box 1 and the cover 2, other raising and lowering means, such as electrically driven screw jacks may be used. While any raising and lowering means having the desired lifting capacity and extension length to raise the cover 2 may be used, the PL-2 Series Medium-Duty Hydraulic Cylinders Model MF 6 available from Schrader Bellows, Des Plaines, Ill. are presently preferred.

In one aspect, the hydraulic pistons 3 extend out of piston cylinders 14 that are attached in each corner of the storage box 1. While not shown, for light duty systems, the piston cylinders 14, or other raising and lowering devices, may be attached with metal rods and the like to maintain the relative position of the devices in the truck bed. This additional stabilization of the raising and lowering devices may be preferred when the storage box 1 is constructed of light duty fiberglass or absent. The pistons 3 extend from the piston cylinders 14 inside the storage box 1 and terminate in piston head chambers 4. The piston head chambers 4 also may function as supports for cover rack system 130.

The cover rack system 130 may include the piston head chambers 4, horizontal bars 5 that extend between each of the piston head chambers 4, and intermediate supports 6, which may connect the horizontal bars 6 to the cover 2 between the piston head chambers 4.

FIG. 2 depicts a side view of the bed system 100 with the cover 2 in a raised position. A hydraulic system 210 is depicted in the cut-away. The hydraulic system 210 includes a hydraulic pump 11, driven by a motor 15, in fluid communication with an optional hydraulic fluid reservoir 12. The pump 11 and the optional reservoir 12 are in fluid communication with tubing 13, which provides fluid communication between the pump 11, reservoir 12, and piston cylinders 14. When the hydraulic fluid (not shown) reaches the piston cylinders 14, force is exerted against the pistons 3, thus causing the cover 2 to raise while remaining substantially parallel with the truck bed (not shown).

Similarly, when the motor 15, or alternatively a release valve (not shown) is opened, the fluid drains from the piston cylinders 14 through the tubing 13 and back to the reservoir 12 or the pump 11. Draining of the fluid from the piston cylinders 14 removes the pressure exerted against the pistons 3, thus allowing the cover 2 to lower. Because the cover 2 cannot substantially move up or down without fluid flowing either into or out from the cylinders 14, the cover 2 is securely held to the truck bed unless the hydraulic system 210 is engaged. While the motor 15 preferably uses direct current, alternating current also may be used.

While the hydraulic pump 11 may be any pump that adequately lifts the cover 2 and any items atop the cover 2, the Monarch D.C. Hydraulic Power Systems Model M-258, available from Monarch Hydraulics, Inc., Grand Rapids, Mich. may be used. The hydraulic fluid reservoir 12 may be separate from the pump 11, or may be integrated into the pump 11, as is the case when the M-258 pump is used.

FIG. 3 is a perspective view of a heavy duty bed system 300 with an added ladder rack 340. In this aspect, the curved edge 7 that provides an overlap with the top of the truck bed 1010 may not be attached to the cover 2 as was the case for the bed system 100 (FIGS. 1 and 2), but may instead be attached to the storage box 1. Similarly, the cover 2 may be reduced in size in relation to that of the system 100 so that the cover 2 of FIG. 3 engages with sealing ledge 350 when closed. In this manner, the rack receivers 1005 of the truck bed (not shown) may be accessed through openings 356 in a top plate portion 355 of the storage box 1. Thus, the ladder rack 340 may be fitted to the truck bed 1000, while the weather and entry seal is maintained between the cover 2 and the storage box 1. While one implementation of the ladder rack 340 is depicted, any suitable structure that does not interfere with the operation of the cover 2 may be used. FIG. 4 depicts a side view of the system 300 with the cover 2 in the raised position and a cut-away provided to show a hydraulic lift system 410.

FIG. 5 depicts a top view of a stabilizing cover guide 500. The guide 500 may be used in combination with the ladder racks 340 (FIG. 3) to provide additional stability to the cover 2. The guide 500 provides operative connectivity between the ladder racks 340 and the head chamber 4. While not required, the system 300 can lift substantially heavier and more unbalanced loads on the cover 2 when equipped with the guide 500. Under the head chamber 4 resides a hydraulic cylinder 503 including the piston cylinder 14 and the interior piston 3.

The guide 500 may provide operative connectivity between the head chamber 4 and a ladder rack upright 510. The ladder rack upright 510 may be seen as the vertical members of the ladder rack 340 in FIG. 3. The head chamber 4 may be attached to a shaft 520. The shaft 520 may be attached to an axle 530 that carries guide wheels 540. The guide wheels 540 may be enclosed by the rack upright 510, thus allowing the cover 2 to travel vertically along the rack upright 510, but not substantially in other directions. The rack upright 510 may be attached to a top surface 555 of the storage box 1 by bolts 10, or the like. The upright 510 also may extend through the top surface 555 through an opening 560 in the surface 555 and extend into the receivers (not shown) of the truck bed. By substantially limiting the movement of the cover 2 to the vertical plane, increased stability may be imparted to the load during the raising and lowering of the cover 2.

While not shown in FIG. 5, the guide wheels 540 of the stabilizing cover guide 500 may be replaced with metal plates, pins, or other structures allowing for the cover 2 to travel vertically along the rack upright 510, but not substantially in other directions. The guide wheels 540 or the metal plates, pins, or other structures may be covered with and/or include plastics, such as TEFLON®, or other friction modifying materials. The rack upright 510 may include removable stops (not shown) that when contacted by the guide wheels 540 or other positioning structure residing within the rack upright 510 cause the ladder rack 340 to lift from the truck bed. In this way, when tall materials reside on the cover 2 that would contact the ladder rack 340 and prevent the raising of the cover 2, the rack 340 can move vertically with the cover 2.

Figure 6:
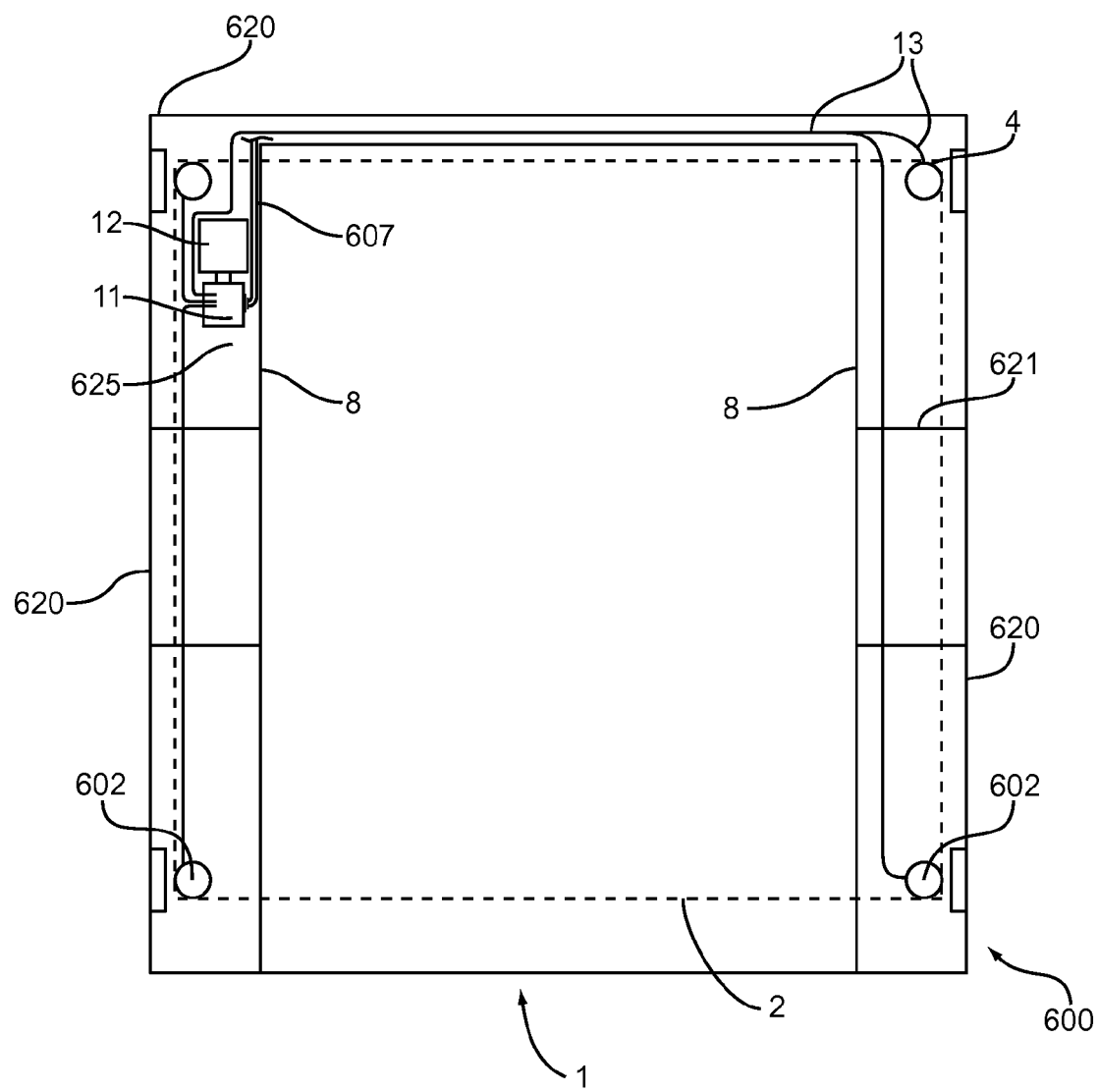
FIG. 6 is a schematic of the truck box depicting one embodiment of a hydraulic raising system.

FIG. 6 is a top view schematic of the bed system of the present invention depicting one embodiment of a hydraulic raising system 600. Hydraulic cylinders 602 are placed in each of the four corners of the storage box 1. Each of the cylinders 602 may be in fluid communication with the hydraulic pump 11 and the reservoir 12 through the flexible tubing 13. In this aspect, the inner walls 8 of the storage box 1 may be spaced 6 to 8 inches from the outer walls 620 to form a space 625. The space 625 may provide for positioning of the pump 11, reservoir 12, and tubing 13, for example. The space 625 also may provide for wires 607 establishing electrical communication between an electric source (not shown), such as the battery of the vehicle, and the pump 11. The storage box 1 also may include the stiffening ribs 621 connecting the walls 8, 620 to add rigidity. The raisable cover 2 is depicted with a dashed line to show its position in relation to the head chambers 4.

While various embodiments of the invention have been described, it will be apparent to those of ordinary skill in the art that other embodiments and implementations are possible within the scope of the invention.

What is claimed is:

1. A bed system for a truck bed, comprising:
    a storage box having a structurally rigid raisable cover;
    the box adapted to reside within the truck bed having at least three sides;
    the cover configured to substantially carry the weight capacity of the truck bed;
    the box comprising at least three sides where at least two of the at least three sides include an outside wall and an inside wall; and
    wherein at least two lifting devices attached to the cover and to the box, wherein the lifting devices are operable to raise and lower the cover in a substantially planar relationship to the truck bed.

2. The system of claim 1, the cover configured to carry at least ½ ton (453 kg).

3. The system of claim 1, comprising four lifting devices positioned substantially in each of the four internal corners of the storage box.

4. The system of claim 2, where the lifting devices are hydraulic cylinders.

5. The system of claim 2, where the lifting devices are electrically driven screw jacks.

6. The system of claim 1, the storage box held in the truck bed by an interference or size fit.

7. The system of claim 1, the cover including at least one curved edge adapted to extend over a top portion of the truck bed.

8. The system of claim 4, the cover including at least two piston head chambers for receiving hydraulic pistons.

9. The system of claim 8, the at least two piston head chambers connected by a horizontal bar.

10. The system of claim 1, at least two of the three sides including outside and inside walls.

11. The system of claim 3, the lifting devices configured to substantially limit the movement of the raisable cover to the vertical plane while the raisable cover remains in the substantially planar relationship to the truck bed.

12. The system of claim 1, the raisable cover including multiple panels joined to form a single panel.

13. The system of claim 12, the multiple panels each formed as a sheet attached to structural members.

14. The system of claim 1, the raisable cover including a structural member having a honeycomb shape.

* * * * *